US009134800B2

(12) United States Patent  (10) Patent No.: US 9,134,800 B2
Maeda  (45) Date of Patent: Sep. 15, 2015

(54) GESTURE INPUT DEVICE AND GESTURE INPUT METHOD

(75) Inventor: Shigenori Maeda, Kyoto (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 335 days.

(21) Appl. No.: 13/700,141

(22) PCT Filed: Jul. 15, 2011

(86) PCT No.: PCT/JP2011/004056
§ 371 (c)(1),
(2), (4) Date: Nov. 27, 2012

(87) PCT Pub. No.: WO2012/011263
PCT Pub. Date: Jan. 26, 2012

(65) Prior Publication Data
US 2013/0063345 A1 Mar. 14, 2013

(30) Foreign Application Priority Data

Jul. 20, 2010 (JP) ................................ 2010-163369

(51) Int. Cl.
*G06F 3/01* (2006.01)
*G06F 3/0346* (2013.01)
*G06F 3/0481* (2013.01)

(52) U.S. Cl.
CPC .............. *G06F 3/017* (2013.01); *G06F 3/0346* (2013.01); *G06F 3/0481* (2013.01)

(58) Field of Classification Search
None
See application file for complete search history.

(56) References Cited

U.S. PATENT DOCUMENTS

| 5,594,469 | A | 1/1997 | Freeman et al. |
| 7,046,232 | B2 | 5/2006 | Inagaki et al. |
| 7,867,089 | B2 | 1/2011 | Urata et al. |

(Continued)

FOREIGN PATENT DOCUMENTS

| JP | 8-315154 | 11/1996 |
| JP | 2001-306243 | 11/2001 |

(Continued)

OTHER PUBLICATIONS

International Search Report issued Aug. 16, 2011 in International (PCT) Application No. PCT/JP2011/004056.

*Primary Examiner* — Kent Chang
*Assistant Examiner* — Benjamin Morales Fernande
(74) *Attorney, Agent, or Firm* — Wenderoth, Lind & Ponack, L.L.P.

(57) ABSTRACT

A gesture input device includes: a coordinate input detecting unit which sequentially detects coordinate set sequences of a user hand position; a gesture start detecting unit which detects a component indicating a first hand movement for starting a gesture, from a detected first coordinate sequence; a guide image generating unit which generates a gesture guide image for guiding the user to make a gesture including a second hand movement, when the first hand movement component is detected; an intended action component detecting unit which detects a second hand movement component as an intended action component, from a second coordinate sequence detected after the gesture guide image is displayed on the display screen; and a control signal generating unit which detects a component indicating a hand movement corresponding to the gesture from the second coordinate sequence when the intended action component is detected, and generate a control signal according to the detection result.

12 Claims, 8 Drawing Sheets

(56) References Cited

U.S. PATENT DOCUMENTS

| | | | |
|---|---|---|---|
| 8,555,207 B2 * | 10/2013 | Hildreth et al. | 715/863 |
| 2002/0006222 A1 | 1/2002 | Inagaki et al. | |
| 2008/0141181 A1 | 6/2008 | Ishigaki et al. | |
| 2009/0027337 A1 * | 1/2009 | Hildreth | 345/158 |
| 2009/0073117 A1 | 3/2009 | Tsurumi et al. | |
| 2009/0135135 A1 * | 5/2009 | Tsurumi | 345/156 |
| 2009/0217211 A1 | 8/2009 | Hildreth et al. | |
| 2010/0007528 A1 | 1/2010 | Urata et al. | |
| 2010/0007529 A1 | 1/2010 | Urata et al. | |
| 2010/0275159 A1 | 10/2010 | Matsubara et al. | |

FOREIGN PATENT DOCUMENTS

| | | |
|---|---|---|
| JP | 2004-078977 | 3/2004 |
| JP | 2004-356819 | 12/2004 |
| JP | 2006-209563 | 8/2006 |
| JP | 2008-146243 | 6/2008 |
| JP | 2009-75685 | 4/2009 |
| JP | 2010-17388 | 1/2010 |
| JP | 2010-257093 | 11/2010 |
| WO | 2009/108894 | 9/2009 |

* cited by examiner

GESTURE INPUT DEVICE AND GESTURE INPUT METHOD

TECHNICAL FIELD

The present invention relates to a gesture input device which is capable of recognizing, as a gesture, a hand movement such as a hand swing of a user, and controlling a target device based on the recognized gesture.

BACKGROUND ART

Conventionally, gesture input devices have been proposed which are provided in devices having a graphical user interface (GUI) and allow a user to perform an operation of moving a pointer for selecting an item on a display screen or moving the item by intuitively making a hand movement indicating the movement of the pointer or the item. These gesture input devices allow the user to intuitively move the pointer or item on the display screen by means of his or her hand movement. Accordingly, the gesture input devices do not require users to take operation training as required in the case of conventional input devices such as a keyboard and a mouse, and provide an advantageous effect of allowing any user to perform intended operations. Furthermore, some of the proposed gesture input devices have a sensor for detecting a user movement such as a camera and thus do not require any input device such as a remote controller which can be provided or mounted. Using such a gesture input device, a user can always control a target device remotely by moving his or her hand.

In order to configure a practical GUI in such a gesture input device, a pointer indicating one of items on a display screen must be moved according to a hand movement, and at least a predetermined hand operation for changing a selection state of the item indicated by the pointer must be recognized. In connection with this, some of the conventional techniques are intended to change a selection state when a particular hand shape is recognized (see Patent Literature 1 and Patent Literature 2 as examples). On the other hand, one of the conventional techniques is intended to change a selection state based on recognition of a particular hand movement (see Patent Literature 3 as an example).

CITATION LIST

Patent Literature

[PTL 1] Japanese Unexamined Patent Application Publication No. 2004-078977
[PTL 2] Japanese Unexamined Patent Application Publication No 2008-146243
[PTL 3] Japanese Unexamined Patent Application Publication No. 2006-209563

SUMMARY OF INVENTION

Technical Problem

A gesture input device disclosed in Patent Literature 1 moves a pointer according to a hand movement when a user extends his or her index finger, and selects an item indicated by the pointer when the user folds the index finger to fold the hand. On the other hand, a gesture input device disclosed in Patent Literature 2 moves off a focus on a function when a user makes a paper by extending all the fingers and thumb of a hand, and selects the focused function when the user makes a rock by folding all the fingers and thumb of the hand. In other words, these techniques depend on accurate recognition of the shapes of hands, and thus inevitably limit places in which users perform gesture operations in order to enable hand shape measurement with a high spatial resolution required for highly accurate hand shape recognition. Thus, these techniques have a problem that it is difficult to secure both a wide operation range and reliability in operation.

On the other hand, a gesture input device disclosed in Patent Literature 3 is capable of controlling devices based on hand movement recognition with a relatively high accuracy even with a sensor having a spatial resolution lower than in the hand shape recognition. When a user swings a hand vertically or horizontally, this gesture input device moves an object highlighted on a display screen in the hand swing direction. In addition, this gesture input device selects and determines the highlighted object when the user moves the hand toward the display screen. However, hand movements used in operations according to these techniques are movements which may be made unintentionally also when users naturally move his or her hands in daily life. Accordingly, an item on the display screen may be selected accidentally, and an unintended function may be executed. For this reason, these techniques have a problem that it is difficult to enable operations using natural and simple hand movements and to reliably prevent erroneous operations at the same time.

In view of this, the present invention was made with an aim to provide a gesture input device which is capable of controlling a target device using natural and simple hand movements in a wide operation range, and reducing erroneous operations.

Solution to Problem

In order to achieve the aforementioned object, a gesture input device according to an aspect of the present invention is a gesture input device which generates a control signal for controlling a target device, based on a gesture of a user, and the gesture input device including: a coordinate input detecting unit configured to sequentially detect sequences of sets of coordinates, the sets respectively corresponding to positions of a hand of the user; a gesture start detecting unit configured to detect a component indicating a first hand movement predetermined as a hand movement which is made when the user intends to start a gesture, from a first coordinate sequence included in the sequences of sets of coordinates detected by the coordinate input detecting unit; a guide image generating unit configured to generate a gesture guide image for guiding the user to make a gesture including a second hand movement, when the component indicating the first hand movement is detected by the gesture start detecting unit; a display screen control unit configured to display, on a display screen, the gesture guide image generated by the guide image generating unit; an intended action component detecting unit configured to detect a component indicating the second hand movement as an intended action component of the gesture, from a second coordinate sequence which is included in the sequences of sets of coordinates detected by the coordinate input detecting unit, after the gesture guide image is displayed on the display screen by the display screen control unit; and a control signal generating unit configured to detect a component indicating a hand movement corresponding to the gesture from the second coordinate sequence when the intended action component is detected by the intended action component detecting unit, and generate a control signal in accordance with a result of the detection.

With this structure, it is possible to display, on the display screen, the gesture guide image for guiding the user to make the gesture including the second hand movement. Accordingly, when the user makes a gesture according to the gesture guide image displayed on the display screen, the component indicating the second hand movement is detected. For this reason, it is possible to reduce detection of a gesture when the user does not intend to make any gesture by detecting the component indicating the second hand movement as an intended action component and detecting the component indicating the hand movement corresponding to the gesture. In other words, it is possible to operate devices by gestures while preventing such an erroneous operation of the target device due to erroneous detection of a gesture. In addition, the second hand movement is included in a gesture guided by the gesture guide image. Accordingly, the user can naturally make the second hand movement by making the gesture according to the gesture guide image. In other words, with this structure, it is possible to control the target device using natural and simple hand movements in a wide operation range.

In addition, preferably, the display screen control unit be configured to display a cursor at a position which is on the display screen and corresponds to one of the sets of coordinates detected by the coordinate input detecting unit, the guide image generating unit be configured to display the gesture guide image at a position different from the position at which the cursor is displayed, and the second hand movement be a hand movement for moving the cursor to the position at which the gesture guide image is displayed.

With this structure, it is possible to detect, as the intended action component, the component indicating the hand movement for moving the cursor to the position at which the gesture guide image is displayed. Accordingly, it is possible to control the target device using more natural and simpler hand movements.

In addition, preferably, the display screen control unit be configured to display the gesture guide image at a position which is apart from the current position of the cursor in a direction different from a movement direction of the cursor at the time when the component indicating the first hand movement is detected.

With this structure, it is possible to reduce erroneous detection of an intended action component when a hand movement made before the display of the gesture guide image is continued. In other words, it is possible to reduce detection of a gesture when the user does not intend to make the gesture.

In addition, preferably, the display screen control unit be configured to display the cursor at a position corresponding to one of the sets of coordinates detected by the coordinate input detecting unit, and display the gesture guide image with a depth expression which makes the user to see the gesture guide image as if the gesture guide image were positioned behind the cursor in a depth direction on the display screen, and the second hand movement be made toward the depth direction.

With this structure, it is possible to detect the component indicating the hand movement toward the display screen as the intended action component. In general cases, when a user makes a gesture, the user moves his or her hand toward the display screen. The use of the gesture guiding image for guiding the user to move his or her hand toward the display screen makes it possible to control the target device using more natural and simpler hand movements.

In addition, preferably, the coordinate input detecting unit be configured to detect one of the sets of coordinates corresponding to a current one of the positions of the hand of the user, based on a captured image in which the user is present in front of the display screen.

With this simple structure, it is possible to detect the set of coordinates corresponding to the user's hand position based on the image of the user, and to thereby detect the set of coordinates corresponding to the user's hand position.

In addition, preferably, when the user holds and moves a remote controller for gesture input having a motion sensor, the coordinate input detecting unit be configured to detect one of the sets of coordinates corresponding to one of the positions of the hand of the user, based on hand movement information obtained through the motion sensor of the remote controller for gesture input.

With this simple structure, it is possible to detect the set of coordinates corresponding to the user's hand position based on the information output by the remote controller for gesture input, and to thereby detect the set of coordinates corresponding to the user's hand position.

In addition, preferably, the gesture guide image be an image for guiding the user to make a plurality of gestures each including the second hand movement, and the control signal generating unit be configured to detect a component indicating a hand movement corresponding to any one of the plurality of gestures, and generate the control signal according to the gesture corresponding to the component indicating the detected hand movement.

With this simple structure, it is possible to control the target device using the plurality of gestures, and to thereby increase the operability by the user.

In addition, preferably, the display screen control unit be configured to change a display appearance of the gesture guide image on the display screen when the intended action component is detected by the intended action component detecting unit.

With this simple structure, it is possible to notify the user of the detection of the intended action component. This makes it possible to further reduce erroneous operation of the target device by the user and to increase the operability by the user.

In addition, preferably, the first hand movement include the hand movement or a stop of a hand movement in a space having a predetermined size for a given period.

With this simple structure, the gesture guide image is displayed when the user stops moving the hand, and thus it is possible to control the target device using more natural and simpler hand movements.

In addition, the gesture input device may be configured as an integrated circuit.

It is to be noted that the present invention can be implemented not only as the gesture input device, but also as a gesture input method having the steps corresponding to the unique processing units included in the gesture input device. Furthermore, the present invention can be implemented as a program for causing a computer to execute the steps of the gesture input method. Moreover, the program can naturally be distributed through non-transitory recording media such as Compact Disc Read Only Memories (CD-ROMs) and communication media such as the Internet.

Advantageous Effects of Invention

The present invention makes it possible to control a target device using natural and simple hand movements in a wide operation range, and to thereby make it possible to reduce erroneous operations.

DESCRIPTION OF EMBODIMENTS

Hereinafter, embodiments of the present invention are described with reference to the drawings. These embodiments described below show preferred specific examples according to the present invention. More specifically, the numerical values, shapes, materials, structural elements, the arrangement and connection of the structural elements, steps, the processing order of the steps etc. shown in the following embodiments are mere examples, and therefore do not limit the scope of the present invention. The present invention is defined by the scope of the claims. Accordingly, among the structural elements in the following exemplary embodiments, the structural elements not recited as or not corresponding to the elements of any one of the independent claims which define the most generic concept of the present invention are described as the structural elements of the preferred embodiments which are not necessarily required to achieve the aim of the present invention.

Embodiment 1

Figure 1:
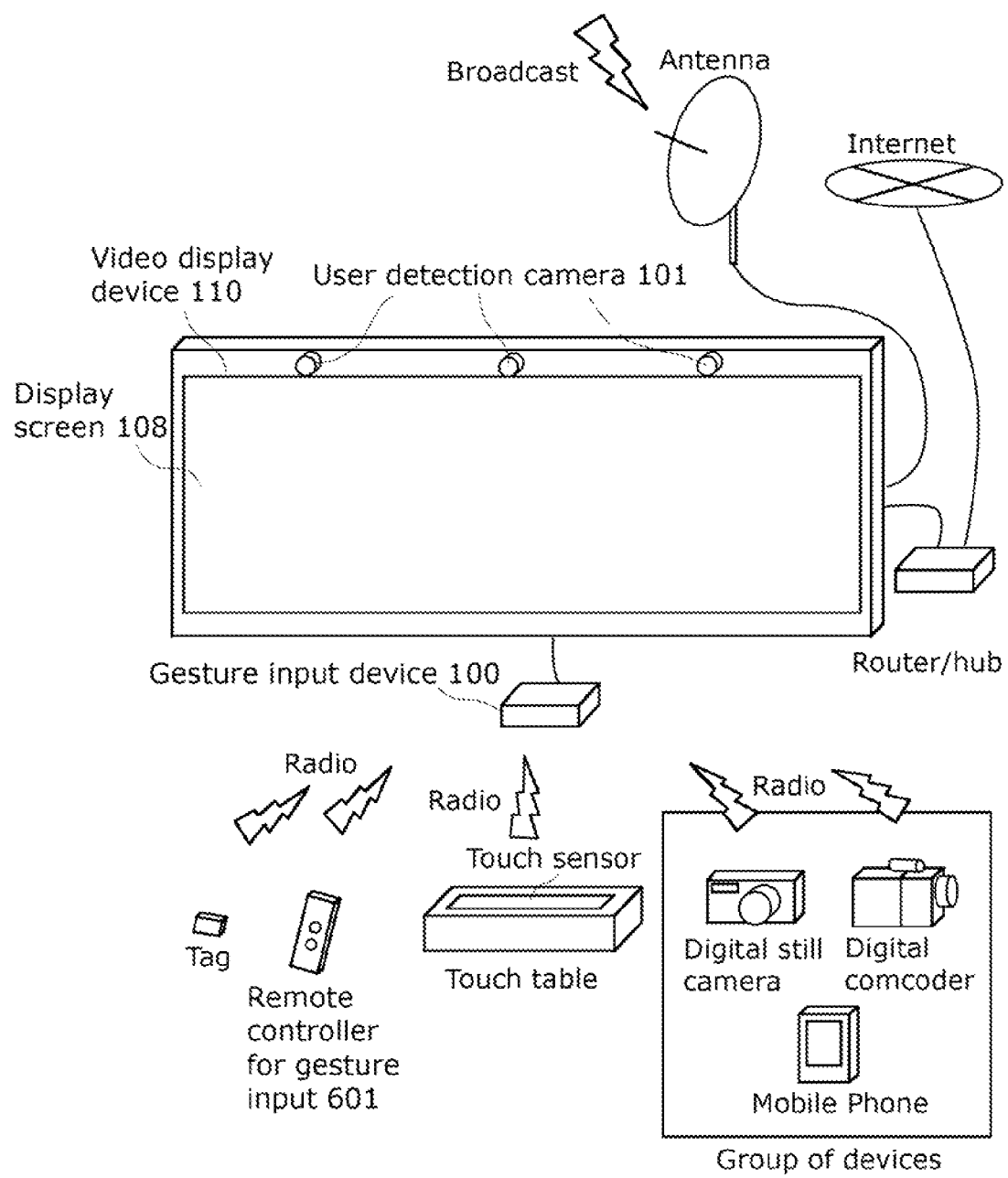
FIG. 1 shows an external view of a gesture input device according to Embodiment 1 of the present invention and shows examples of interfaces with related devices.

FIG. 1 shows an external view of a gesture input device 100 according to Embodiment 1 of the present invention and shows examples of interfaces with related devices. The video display device 110 is connected to an antenna for receiving a broadcast program. In addition, in this embodiment, at least one user detection camera 101 and other devices are mounted on the top part of the video display device 110. The gesture input device 100 controls the video display device 110 using a user position, movement, or body feature detected by analyzing information of an image captured by the user detection camera 101. In other words, the gesture input device 100 generates a control signal for controlling a target device such as the video display device 110, based on a gesture of the user.

The gesture input device 100 may control the video display device 110, based on the position or movement of a hand of the user who holds a remote controller for gesture input 601. In this case, the remote controller for gesture input 601 is a remote controller for coordinate input or the like. In addition, the gesture input device 100 may control the video display device 110, based on a user operation on the remote controller for gesture input 601 (this operation is, for example, a press of a button provided on the remote controller for gesture input 601).

In addition, the gesture input device 100 may control the video display device 110, based on a position or movement of the hand of the user who holds another one of the devices (such as a mobile phone), or based on an operation such as a press of a button provided on the other device.

In addition, the video display device 110 is connected to the Internet through a router/hub, and can display digital information obtained through the Internet.

In addition, the video display device 110 may include a plurality of speakers (not shown in FIG. 1). In this case, the plurality of speakers may be arranged apart from each other, for example, at the top and bottom ends or the left and right ends of the video display device 110.

Figure 2:
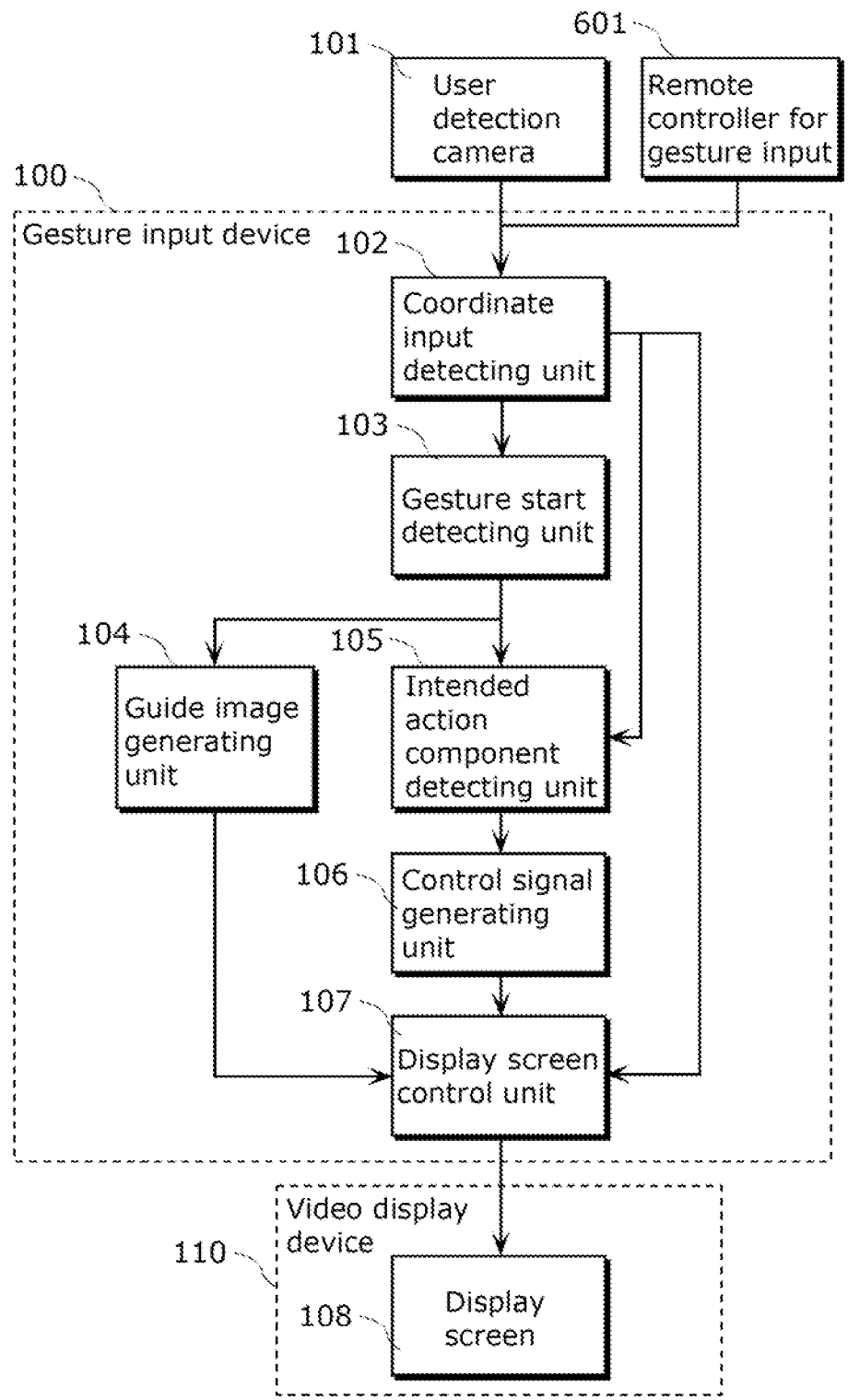
FIG. 2 is a block diagram showing a functional structure of a gesture input device according to Embodiment 1 of the present invention.

FIG. 2 is a block diagram showing a functional structure of a gesture input device according to Embodiment 1 of the present invention. In FIG. 2, the gesture input device 100 includes a coordinate input detecting unit 102, a gesture start detecting unit 103, a guide image generating unit 104, an intended action component detecting unit 105, a control signal generating unit 106, and a display screen control unit 107.

The coordinate input detecting unit 102 sequentially detects sequences of pairs of coordinates corresponding to positions of the hand of the user.

The gesture start detecting unit 103 detects a component indicating a first hand movement predetermined as a hand movement which is made when a user intends to start a gesture, from a first coordinate sequence which is included in the sequences of sets of coordinates detected by the coordinate input detecting unit 102. A coordinate sequence means a set of sets of coordinates arranged along detected time points.

More specifically, for example, the gesture start detecting unit 103 detects, as the component showing the first hand movement, the sequence of sets of coordinates indicating that the hand is moving in a space having a predetermined size for a given period. In addition, for example, the gesture start detecting unit 103 may detect, as the component indicating the first hand movement, the sequence of sets of coordinates indicating that the hand is stopping in a space having a predetermined size for a given period.

The guide image generating unit 104 generates a gesture guide image when the component indicating the first hand movement is detected. The gesture guide image is an image for guiding the user to make the gesture including the second hand movement. In this embodiment, the second hand movement is a hand movement for moving the cursor to the position at which the gesture guide image is displayed. The second hand movement does not always need to be such a hand movement. For example, the second hand movement may be a hand movement for moving the cursor toward the position or direction indicated by the gesture guide image.

The intended action component detecting unit 105 detects the component indicating the second hand movement as the intended action component of the gesture, from a second coordinate sequence which is included in the sequences of sets of coordinates detected by the coordinate input detecting unit 102 after the gesture guide image is displayed on the display screen. The intended action component of a gesture is a sequence of sets of coordinates indicating an action which is made when the user intends to make the gesture.

The control signal generating unit 106 detects a component indicating the hand movement corresponding to the gesture from the second coordinate sequence, when the intended action component is detected by the intended action component detecting unit 105 Next, the control signal generating unit 106 generates a control signal in accordance with a result of the detection. In other words, the control signal generating unit 106 generates a control signal in accordance with the result of detecting the component indicating the hand movement corresponding to the gesture only when the intended action component is detected by the intended action component detecting unit 105. In other words, the control signal generating unit 106 does not detect the component indicating the hand movement corresponding to the gesture when the intended action component is not detected by the intended action component detecting unit 105, or does not generate a control signal irrespective of the detection result.

The display screen control unit 107 displays, on the display screen 108, the gesture guide image generated by the guide image generating unit 104. In other words, the display screen control unit 107 transmits an image signal to the video display device 110 so that the gesture guide image is displayed on the display screen 108.

In addition, the display screen control unit 107 sequentially displays the cursor at positions on the display screen 108 corresponding to the sets of coordinates detected by the coordinate input detecting unit 102. In this embodiment, the display screen control unit 107 displays the gesture guide image at positions different from a current position at which the cursor is displayed. More specifically, the display screen control unit 107 displays the gesture guide image at a position apart from the current position at which the cursor is displayed in a direction different from the cursor movement direction at the time when the component indicating the first hand movement is detected. The gesture guide image does not always need to be displayed at such a position, but may be displayed at a predetermined position.

Next, a description is given of various kinds of operations in the gesture input device 100 configured as described above. First, the outline of operations by the gesture input device 100 is described with reference to FIGS. 3 and 4.

Figure 3:
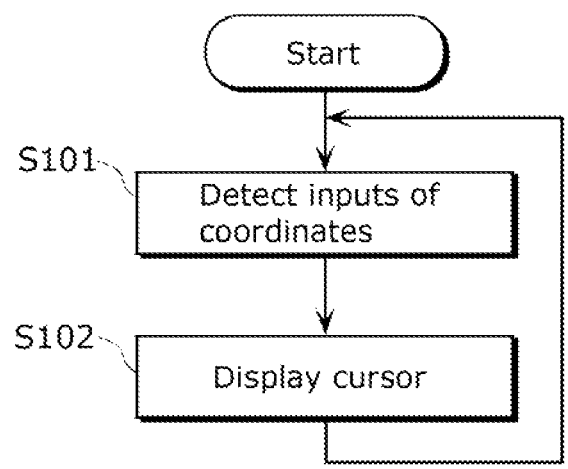
FIG. 3 is a flowchart of operations related to coordinate input detection according to Embodiment 1 of the present invention.

FIG. 3 is a flowchart of operations related to coordinate input detection according to Embodiment 1 of the present invention.

First, the coordinate input detecting unit 102 sequentially detects a set of coordinates corresponding to the position of the hand of the user (S101). Next, the display screen control unit 107 displays the cursor at the position which is on the display screen 108 and corresponds to the detected set of coordinates (S102), and returns to the processing in Step S101.

Figure 4:
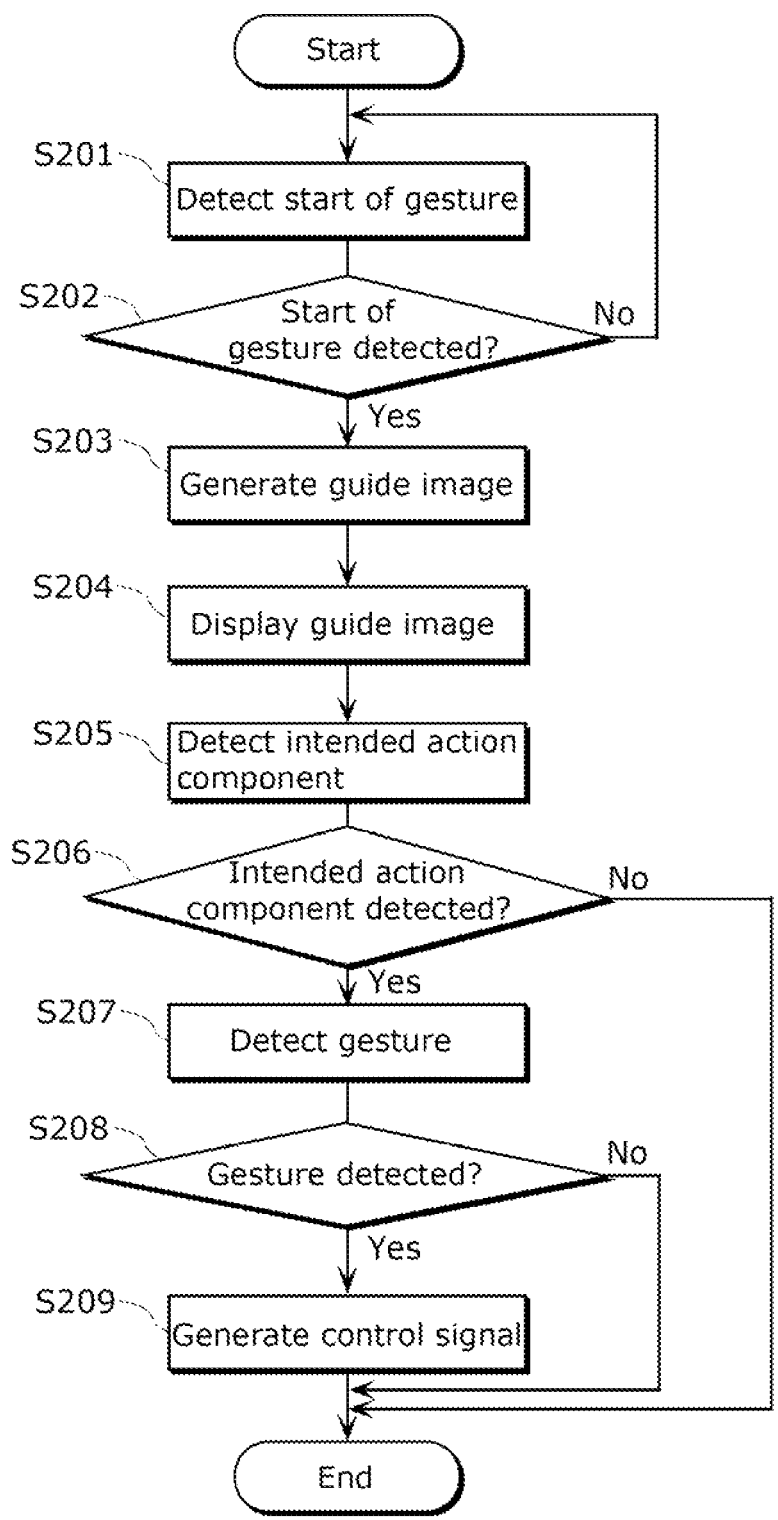
FIG. 4 is a flowchart of operations related to control signal generation according to Embodiment 1 of the present invention.

The processing in Steps S101 and S102 related to coordinate input detection shown in FIG. 3 is repeated for each predetermined cycle, irrespective of whether or not the processing described later with reference to FIG. 4 is performed.

FIG. 4 is a flowchart of operations related to control signal generation according to Embodiment 1 of the present invention.

First, the gesture start detecting unit 103 detects a component indicating a first hand movement predetermined as a hand movement which is made when a user intends to start a gesture, from the first coordinate sequence detected by the coordinate input detecting unit 102 (S201). Here, when any component indicating a first hand movement is not detected (No in S202), the gesture start detecting unit 103 performs the processing in Step S201 again.

On the other hand, when the component indicating the first hand movement is detected (Yes in S202), the guide image generating unit 104 generates a gesture guide image for guiding the user to make the gesture including the second hand movement (S203). The display screen control unit 107 displays, on the display screen 108, the gesture guide image generated by the guide image generating unit 104 (S204).

Next, the intended action component detecting unit 105 detects the component indicating the second hand movement as the intended action component of the gesture, from the second coordinate sequences which are sequences of sets of coordinates detected by the coordinate input detecting unit 102 after the gesture guide image is displayed on the display screen 108 (S205). Here, when any intended action component is not detected (No in S206), the processing is terminated.

On the other hand, when the intended action component is detected (Yes in S206), the control signal generating unit 106 detects the component indicating the hand movement corresponding to the gesture, from the second coordinate sequence (S207). Here, when any component indicating the hand movement corresponding to the gesture is not detected (No in S208), the process is terminated.

On the other hand, when the component indicating the hand movement corresponding to the gesture is detected (Yes in S208), the control signal generating unit 106 generates a control signal in accordance with the detection result (S209). In other words, the control signal generating unit 106 generates a control signal corresponding to the gesture. The control signal generating unit 106 outputs the generated control signal to the video display device 110 through the display screen control unit 107.

In this way, the gesture input device 100 generates a control signal corresponding to the gesture only when the intended action component is detected.

Next, the processes are described in detail with reference to the drawings. First, the process (S101) for detecting sets of coordinates corresponding to the user's hand positions.

The image captured by the user detection camera 101 is input to the coordinate input detecting unit 102. The coordinate input detecting unit 102 extracts, from an input image, an area in which a user hand is included, and calculates the set of coordinates thereof.

Figure 5A:
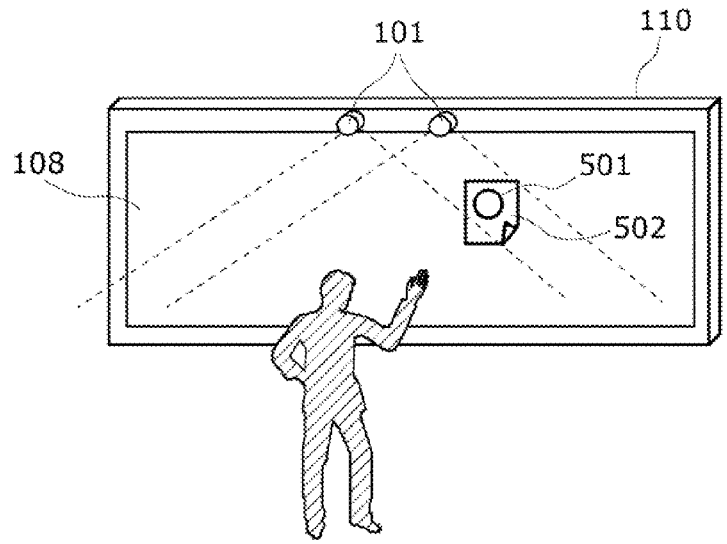
FIG. 5A is a diagram for illustrating details of a coordinate input detection method according to Embodiment 1 of the present invention.
Figure 5B:
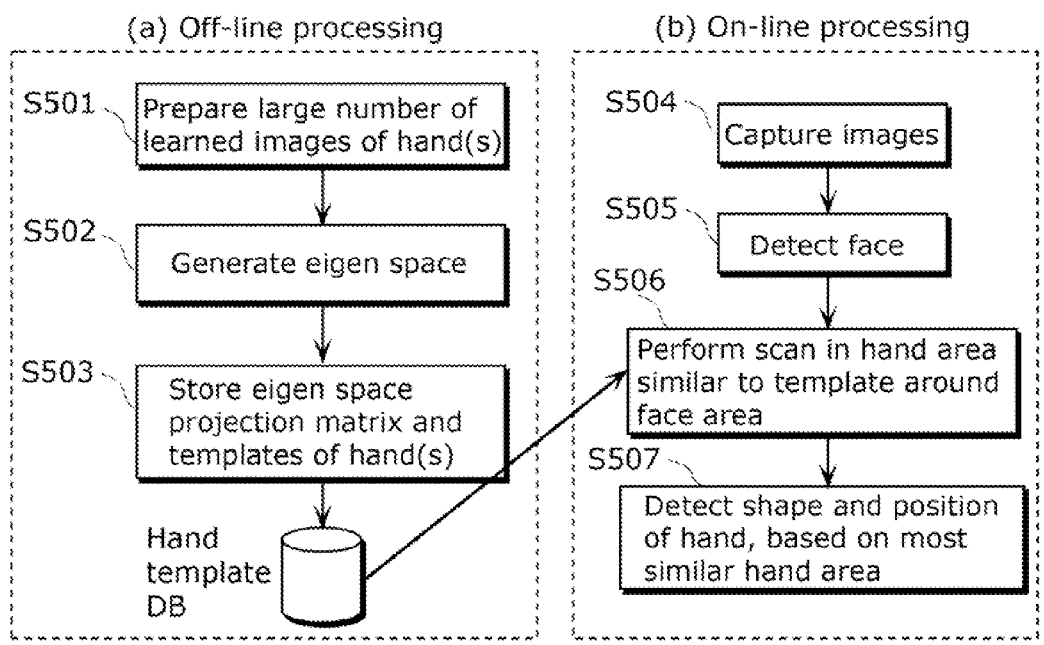
FIG. 5B is a diagram for illustrating details of a coordinate input detection method according to Embodiment 1 of the present invention.

Each of FIGS. 5A and 5B is a diagram for illustrating the user's hand detection method performed by the coordinate input detecting unit 102 according to this embodiment.

As shown in FIG. 5A, the coordinate input detecting unit 102 detects the position of a person in an image captured by the user detection camera 101, and detects the position of a hand around the position of the person. An exemplary method used as this method of detecting user's hand position is shown below. Hereinafter, with reference to FIG. 5B, the method of detecting the user's hand position is described.

First, as shown in (a) of FIG. 5B, a large number of images for learning user's hand(s) desired to be detected is prepared (S501) as off-line processing. Conditions such as a lighting environment or a lighting orientation for such images for learning are made suitably for the actual environment for detecting user's hand as much as possible. Next, based on the images for learning prepared in Step S501, an eigen space including principal components of the user's hand is generated using principal component analysis (S502). In addition, template images of user's hand(s) desired to be detected are prepared. The template images may be an average image of images for learning of the user's hand(s) or images of the hand in the shapes of a rock, paper, or the like. The projection matrix of the generated eigen space and the templates of the hand(s) are stored in a hand template database (S503).

Next, off-line processing for detecting an actual hand is described with reference to (b) of FIG. 5B.

First, the user detection camera 101 captures an image of the user who is present in front of the display screen 108 of the video display device 110 (S504). Next, the coordinate input detecting unit 102 detects a face area from the captured image (S505).

When the face area is detected in Step S505, the coordinate input detecting unit 102 detects a hand around the face area. More specifically, the coordinate input detecting unit 102 scans an area similar to a hand template stored in the hand template database in a scanning area around the face area (S506). More specifically, the coordinate input detecting unit 102 performs template matching, and scans the area similar to the hand template. The scanning area around the face area may be an area having a size predetermined with reference to the face position, or may be an area having a small depth distance from the face in an area surrounding the face, based on the principle of stereoscopic viewing using two cameras. In this way, it is possible to reduce the range of the scanning area.

More specifically, for example, the coordinate input detecting unit 102 projects, in the eigen space, a candidate hand area image extracted from the scanning area and the hand template image, using a prepared projection matrix. Next, the coordinate input detecting unit 102 calculates the degree of similarity by comparing the distance between the both in the eigen space. In this way, the coordinate input detecting unit 102 is capable of reducing the influence of noise such as background noise, in the detection of the area similar to the hand template by comparing the distance in the space indicating the principal components of the hand. The coordinate input detecting unit 102 detects, as a hand position in the scanning area, the position of the area which satisfies a predetermined threshold value and has the smallest distance from the hand template (S507).

In this way, the coordinate input detecting unit 102 detects the set of coordinates corresponding to the user's hand position, based on the image of the user present in front of the display screen 108 captured by the user detection camera 101.

When there is no area which satisfies the threshold value in the search area, the coordinate input detecting unit 102 terminates the detection as determining that the user is not extending his or her hand toward the display screen.

In this example, the coordinate input detecting unit 102 uses a template matching approach for hand position detection, but another approach such as a boosting approach may be used for such hand position detection.

The display screen control unit 107 displays a cursor 501 at a corresponding position on the display screen 108 of the video display device 110 as shown in FIG. 5A, based on the information of hand position detected by the coordinate input detecting unit 102. As a result, the user can determine that an option 502 indicated by the cursor 501 is currently being selected, and select the option 502 by performing a predetermined selection operation (such as moving his or her hand toward the display screen or toward himself or herself). This scheme of operating the video display device 110 by changing the user's hand position is referred to as an operation scheme by free hand gestures.

Next, an operation scheme different from the operation scheme by free hand gestures is described with reference to FIGS. 6A and 6B.

Figure 6A:
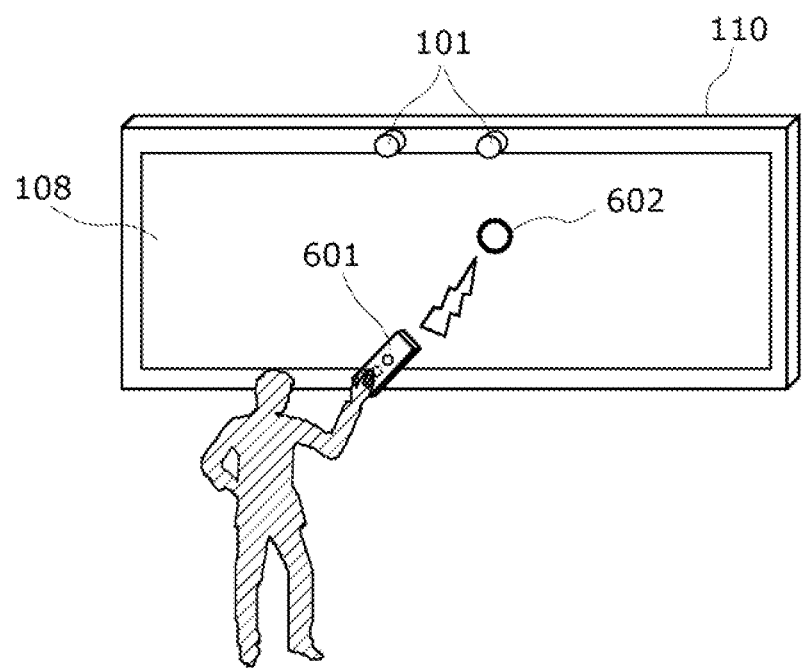
FIG. 6A is a diagram showing an example of the coordinate input method according to Embodiment 1 of the present invention.
Figure 6B:
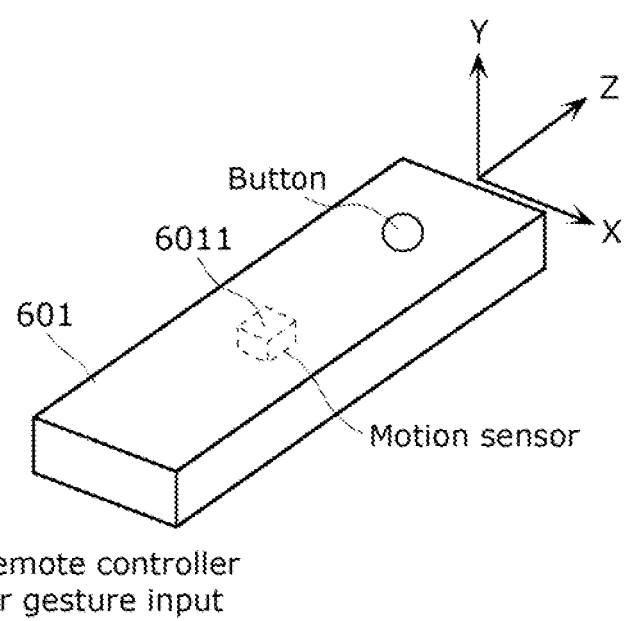
FIG. 6B is a diagram showing the structure of a remote controller for coordinate input according to Embodiment 1 of the present invention.

Each of FIGS. 6A and 6B is a diagram for illustrating a coordinate input method using a remote controller for gesture input according to this embodiment.

As shown in FIG. 6A, the user can change the position of the cursor 602, by moving his or her hand according to a predetermined movement (such as a swing of a hand or a rotation of an arm) when holding the remote controller for gesture input 601 or by indicating, by the hand, a desired position on the video display device.

FIG. 6B is a diagram showing the structure of the remote controller for gesture input 601. The remote controller for gesture input 601 includes a motion sensor 6011. The motion sensor 6011 detects a hand movement of the user who holds the remote controller for gesture input 601. In addition, the remote controller for gesture input 601 may include a button as shown in FIG. 6B.

The motion sensor 6011 is one of an acceleration sensor, an angular rate sensor (rate gyroscope), and a geomagnetism sensor (electric compass), or a combination of two of these sensors. The acceleration sensor detects acceleration with respect to a predetermined axis. The acceleration sensor detects, for example, an acceleration in each of three axes (axis X, axis Y, and axis Z) which are orthogonal to each other as shown in FIG. 6B.

For example, it is assumed here that the user moves at least one of the wrist and arm while holding the remote controller for gesture input 601. At this time, at least one of the position and posture of the remote controller for gesture input 601 is changed. Here, the coordinate input detecting unit 102 checks whether or not data indicating the movement detected by the remote controller for gesture input 601 matches the data indicating the predetermined hand movement (gesture). As a result, the position on the display screen which the user indicates using the remote controller for gesture input 601 is calculated.

In this example, the acceleration sensor is used as means for detecting at least one of the position and posture of the remote controller for gesture input 601. However, for a similar purpose, it is possible to use an angular rate sensor (rate gyroscope) or a geomagnetism sensor (electric compass) instead.

The display screen control unit 107 performs application control based on the input of the position corresponding to the position on the display screen 108 of the video display device 110 (such control is, for example, moving the cursor 602 as shown in FIG. 6A or activating an application indicated by the cursor 602).

This scheme for operating, while holding the remote controller for gesture input 601, the video display device 110 (i) by making the predetermined hand movement (gesture) or (ii) by indicating the desired position on the video display device 110 is referred to as an operation scheme using a remote controller for gesture input.

In this way, the coordinate input detecting unit 102 according to this embodiment in FIG. 2 outputs a set of coordinates corresponding to user's hand position according to any of the operation scheme by free hand gesture and the operation scheme using the remote controller for gesture input. The display screen control unit 107 associates the set of coordinates with the position on the display screen 108 of the video display device 110 and uses the set of coordinates to control the GUI to be displayed on the display screen 108.

Figure 7:
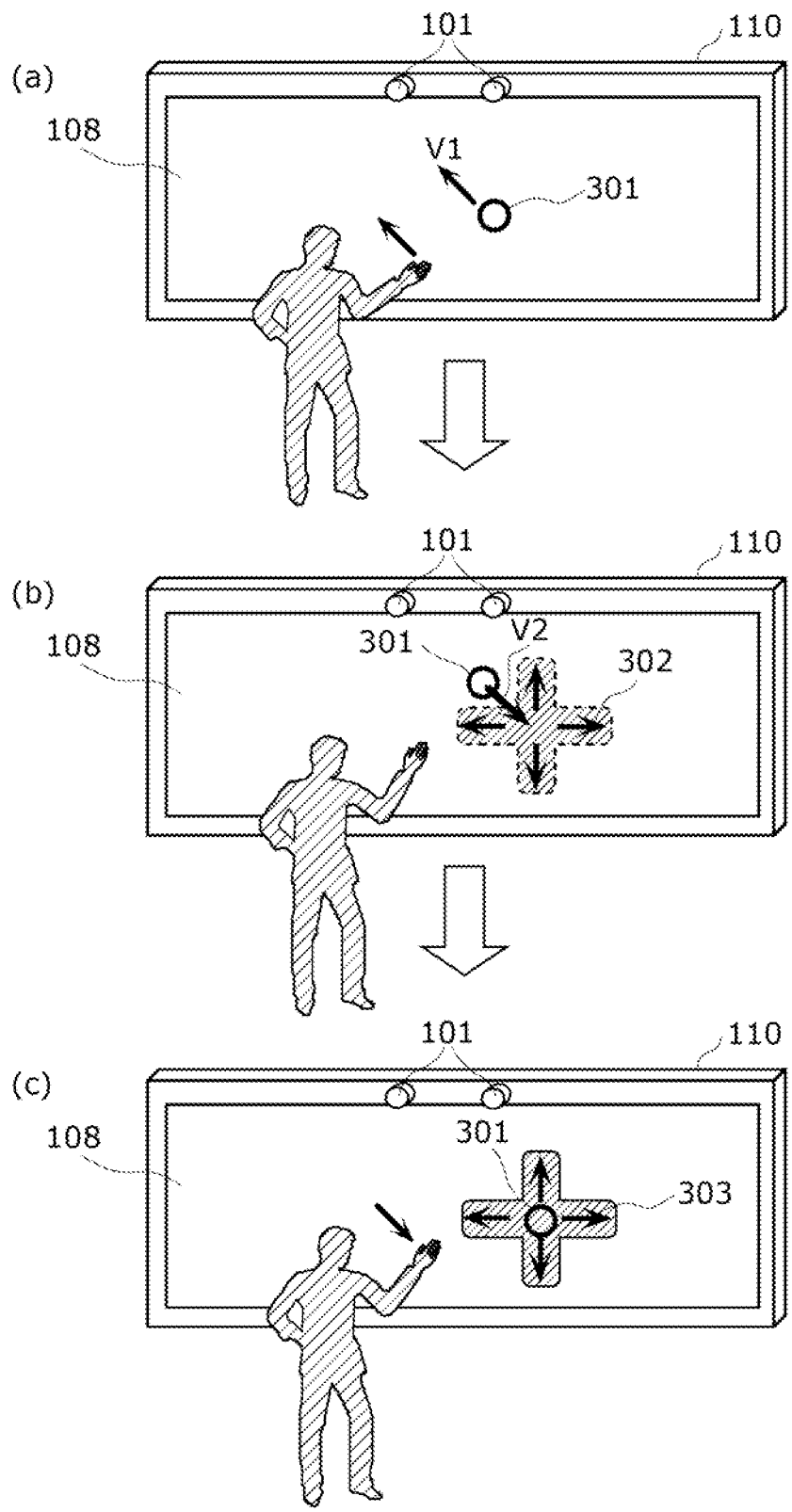
FIG. 7 is an illustration of a typical use case of the gesture input device according to Embodiment 1 of the present invention.

Next, the flowchart shown in FIG. 4 is described in detail taking the use case shown in FIG. 7. In FIG. 7, (a) shows an exemplary state in which the display screen control unit 107 presents the cursor 301 at the position on the display screen 108 corresponding to the set of coordinates of the user's hand.

The gesture start detecting unit 103 detects a user's hand movement component indicating a start of the gesture which is a predetermined hand movement, from the sequence of sets of coordinates indicating the user's positions input from the coordinate input detecting unit 102. In other words, the gesture start detecting unit 103 detects a component indicating the first hand movement which is made when the user intends to start the gesture.

For example, the gesture start detecting unit 103 is only required here to determine, as the first hand movement indicating the start of the gesture, a stoppage of the user's hand movement for a predetermined period (that is, the set of coordinates of the hand output from the coordinate input detecting unit 102 is not deviated from a predetermined small space for a predetermined period). In this way, the user can naturally make the gesture after presenting the intention to start the gesture.

After the gesture start detection unit 103 detects the first hand motion indicating the start of the gesture, the guide image generating unit 104 generates a gesture guide image for guiding the user to make a hand movement which should be made next, and outputs the gesture guide image to the display screen control unit 107. Next, the display screen control unit 107 displays, on the display screen 108, the gesture guide image.

In FIG. 7, (b) shows an exemplary gesture guide image for guiding the user to swing his or her hand vertically and horizontally in the four directions, that is, sequentially making gestures for scrolling the display screen in the four directions. In this example, the display screen control unit 107 displays a first gesture guide image 302 at a position obtained by adding a vector V2 to the position (at which the cursor 301 is displayed) on the display screen corresponding to the set of coordinates of the user's hand when the component indicating the first hand movement is detected by the gesture start detecting unit 103. In other words, the display screen control unit 107 displays the first gesture guide image 302 at the position different from the position at which the cursor 301 is displayed.

Preferably, the vector V2 should have a direction different from the direction of a vector V1 ((a) in FIG. 7) indicating the hand movement direction immediately before the detection of the component which indicates the user's hand movement indicating the start of the gesture. Preferably, the vector V2 should have a direction opposite to or orthogonal to the direction of the vector V1.

In other words, the display screen control unit 107 should preferably display the gesture guide image at the position apart from the position at which the cursor 301 is displayed in the direction (of the vector V2) different from the cursor movement direction (of the vector V1) at the time of the detection of the component indicating the first hand movement. Preferably, the display screen control unit 107 should display the gesture guide image at the position apart from the display position of the cursor 301 in the direction opposite to or orthogonal to the direction of the vector V1.

In this way, the possibility of unintentional entrance into a gesture reception state described later is expected to be reduced. In other words, it is possible to reduce erroneous detection of an intended action component when a hand movement made before the display of the gesture guide image is continued. Accordingly, the gesture input device 100 can reduce erroneous detection of an intended action component when the user does not intend to make the gesture, and that a control signal is generated.

Next, the user makes a hand movement for moving the cursor 301 to the center part of the first gesture guide image 302. At this time, the intended action component detecting unit 105 obtains, from the coordinate input detecting unit 102, the sequence of sets of coordinate indicating the hand movement for moving the cursor 301 to the center part of the first gesture guide image 302.

In this way, the intended action component detecting unit 105 detects the intended action component indicating the user's intention to make the gesture according to the guidance by the first gesture guide image 302 generated by the guide image generating unit 104. In other words, the intended action component detecting unit 105 detects, as the intended action component, the component indicating the hand movement for moving the cursor 301 to the position at which the first gesture guide image 302 is displayed, from the second sequence of sets of coordinates detected after the gesture guide image is displayed on the display screen.

Next, the intended action component detecting unit 105 gives an instruction for entrance into the gesture reception state to the control signal generating unit 106. The control signal generating unit 106 detects the component indicating the hand movement corresponding to the gesture, from the sequence of sets of coordinates detected by the coordinate input detecting unit 102.

At this time, the control signal generating unit 106 should preferably instruct the display screen control unit 107 to display information indicating the entrance into the gesture reception state. In FIG. 7, (c) shows an example of the display of the information. In (c) of FIG. 7, the first gesture guide image 302 shown in (b) of FIG. 7 is replaced by a second gesture guide image 303. This second gesture guide image 303 is an image indicating the entrance into the gesture reception state and clearly shows the boundary of the first gesture guide image 302.

In this way, the display screen control unit 107 should preferably change the display appearance of the gesture guide image on the display screen 108 when the intended action component is detected by the intended action component detecting unit 105. In this way, the gesture input device 100 can present the user with the information indicating the detection of the intended action component, and thus can reduce erroneous operations. In addition, the gesture input device 100 enables the user to recognize that a gesture is not received when an intended action component is not detected. Accordingly, the gesture input device 100 can reduce the possibility that an intended gesture is not detected, and increase the operability by the user.

Although the second gesture guide image 303 is an image which clarifies the boundary of the first gesture guide image in (c) of FIG. 7, the second gesture guide image 303 does not always need to be such an image. The second gesture guide image 303 may be any other image which enables the user to recognize the change from the first gesture guide image 302. In other words, the second gesture guide image 303 may be an image obtained by changing the display appearance of the first gesture guide image 302. For example, the second gesture guide image 303 may be an image obtained by changing the color of the first gesture guide image 302.

Next, the user makes a receivable gesture displayed on the display screen 108 (the gesture is a hand swing in one of the vertical and horizontal four directions). At this time, the control signal generating unit 106 detects, as the component indicating the hand movement corresponding to the gesture, the component indicating the hand swing in any of the four directions, from the sequence of sets of coordinates detected by the coordinate input detecting unit after the entrance into the gesture reception state.

Next, the control signal generating unit 106 generates a control signal according to the component indicating the hand movement corresponding to the detected gesture. For example, when the user makes a gesture of swinging his or her hand to the left, the control signal generating unit 106 outputs a control signal indicating "a gesture of swinging the hand to the left" to the display screen control unit 107. For example, when a large number of content data items such as photographs are aligned on the display screen 108, the display screen control unit 107 transmits, to the video display device 110, a control signal for scrolling all the content data items in the left direction and displaying new content data items at the right end part. In other words, the display screen control unit 107 causes the video display device 110 to execute the function associated with the control signal.

As described above, the gesture input device 100 according to this embodiment displays in advance, on the display screen 108, the gesture guide image for guiding the gesture when the user controls, using gestures which are hand movements, the GUI on the display screen 108 of the video display device 110. The gesture input device 100 detects the intended action component which is a component expected to be included in the hand movement when the user viewing the gesture guide image intends to make the gesture. When detecting this intended action component, the gesture input device 100 transits to a gesture reception state. In this way, the gesture input device 100 reduces erroneous operations due to unintended hand movements, and can control the GUI on the display screen of the video display device reliably by gestures.

In other words, the gesture input device 100 according to this embodiment makes it possible to display, on the display screen, the gesture guide image for guiding the user to make the gesture including the second hand movement. Accordingly, when the user makes the gesture according to the gesture guide image displayed on the display screen, the component indicating the second hand movement is detected. For this reason, it is possible to reduce erroneous detection of a gesture when the user does not intend to make any gesture by detecting the component indicating the second hand movement as an intended action component and detecting the component indicating the hand movement corresponding to the gesture. In other words, it is possible to operate devices by gestures while preventing erroneous operations of the target device due to erroneous detection of a gesture. In addition, the second hand movement is the movement included in the gesture guided by the gesture guide image. Accordingly, the user can naturally make the second hand movement by making the gesture according to the gesture guide image. In other words, the gesture input device 100 according to this embodiment makes it possible to control the target device using natural and simple hand movements in a wide operation range.

In this embodiment, the gesture start detecting unit 103 detects, as the component indicating the hand movement which is made when the user intends to start the gesture, presence of the set of coordinates corresponding to the user's hand position in a predetermined small space for a predetermined period. However, the gesture start detecting unit 103 may detect the start of the gesture based on information other than the set of coordinates corresponding to the user's hand position.

For example, the gesture start detecting unit 103 may detect a component which indicates a user's hand movement indicating the user's intention to start the gesture, only when the user faces the display screen 108. In this way, when the user does not face the display screen 108 because he or she does not intend to make any gesture, it is possible to prevent the guide image generating unit 104 from displaying a gesture guide image on the display screen 108. Here, the orientation of the user's face may be detected by, for example, matching a face area detected from the image captured by the user detection camera 101 and the face templates of a face or faces oriented in various directions.

In addition, the gestures guided by the gesture guide image in this embodiment are a hand swing in any of the vertical and horizontal directions which is made after the user moves his or her hand to move the cursor to the center of the image, but gestures available in the present invention are not limited to these gestures. For example, the gestures may be replaced by gestures of moving the hand toward himself or herself or moving the hand toward the display screen. Furthermore, the gesture may be a clockwise or counterclockwise hand rotation in front of his or her body. In addition, the gestures guided by the gesture guide image do not always need to be a plurality of gestures, and may be a single gesture (for example, a gesture in one direction).

Embodiment 2

Next, Embodiment 2 of the present invention is described.

Figure 8:
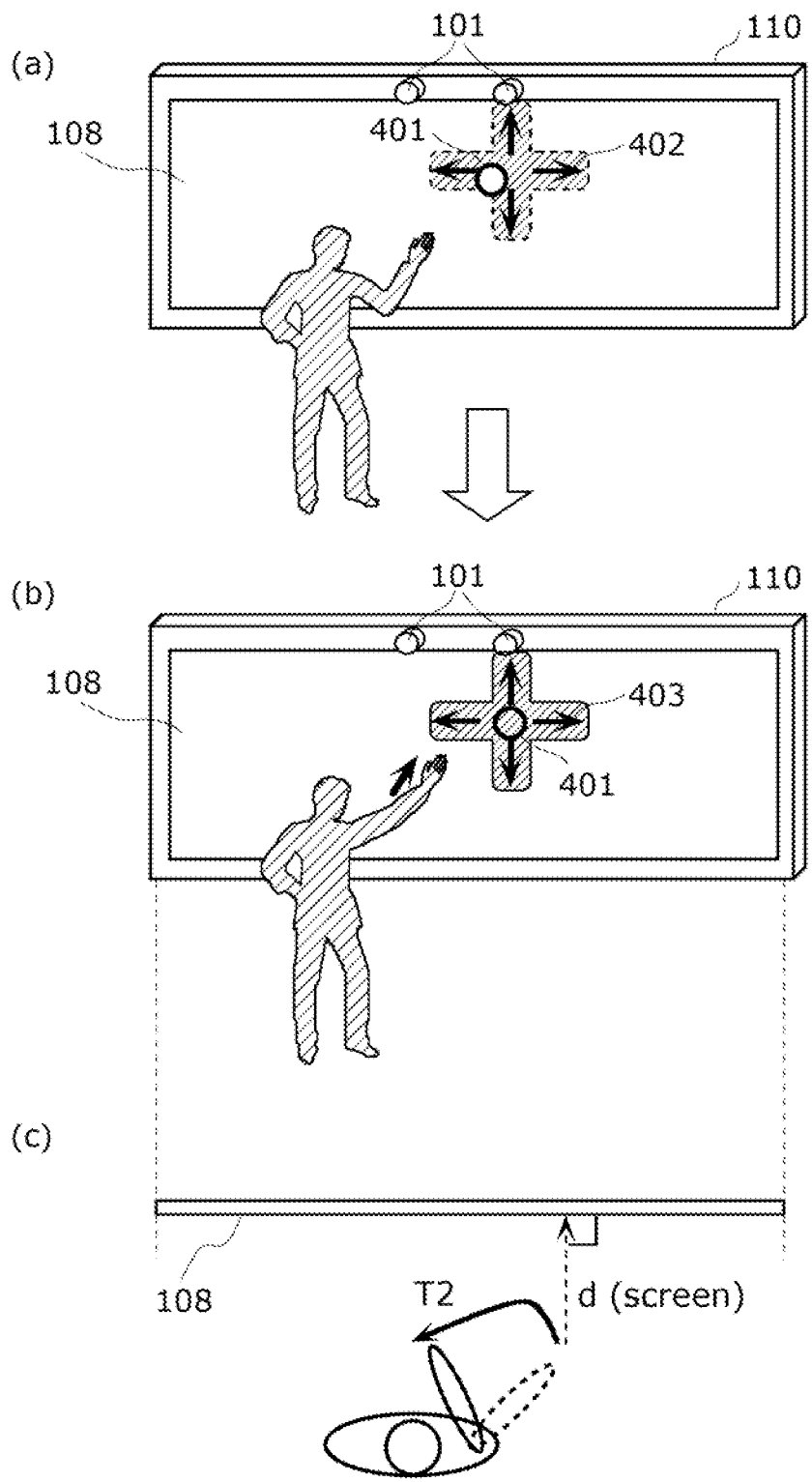
FIG. 8 is an illustration of a typical use case of the gesture input device according to Embodiment 2 of the present invention.

FIG. 8 is an illustration of a typical use case of the gesture input device according to Embodiment 2 of the present invention. In this embodiment, FIG. 2 also functions as a block diagram of functional elements of a gesture input device 100 according to this embodiment, but a guide image generating unit 104 and an intended action component detecting unit 105 in this embodiment have functions partly different from the guide image generating unit 104 and the intended action component detecting unit 105 in Embodiment 1. The structural elements other than the guide image generating unit 104 and the intended action component detecting unit 105 have the same functions, and are not described here.

In FIG. 8, (a) shows the state in which a gesture start detecting unit 103 detects the component which indicates the hand movement indicating user's intention to start a gesture, and upon the detection, a first gesture guide image 402 generated by the guide image generating unit 104 is displayed on a display screen 108.

Here, as shown in (c) of FIG. 8, a sequence T1 of sets of coordinates which is detected when the user makes a gesture of swing his or her hand toward the display screen 108 of the video display device 110 is likely to have a component indicating a movement in a direction d (screen) (which is opposite to the normal direction of the display screen 108). For this reason, when the user intends to make a gesture, the guide image generating unit 104 generates a first gesture guide image 402 which amplifies the hand movement in the direction d (screen) toward the display screen 108.

In other words, as shown in (a) of FIG. 8, the display screen control unit 107 displays the first gesture guide image 402 using a depth expression which makes the user to see the gesture guide image 402 as if the gesture guide image 402 were displayed at a deeper position than the cursor 401 displayed at a current position which is on the display screen 108 and corresponds to the set of coordinates of the hand of a user. In short, the display screen control unit 107 displays the first gesture guide image 402 using a depth expression which makes the user to see the gesture guide image 402 as if the gesture guide image 402 were positioned behind the cursor in the display screen.

For example, the display screen control unit 107 may display the first gesture guide image 402 unclearly than the cursor. In addition, for example, the display screen control unit 107 may display the first gesture guide image 402 three-dimensionally so that the first gesture guide image 402 is displayed at a position deeper than the position of the cursor. Alternatively, the display screen control unit 107 may display the first gesture guide image 402 with a depth expression using perspective viewing.

In addition, the intended action component detecting unit 105 detects, as the intended action component, the component indicating the hand movement in the direction d (screen) toward the display screen 108, from the sequence of sets of coordinates (the second coordinate sequence) detected after the detection of the component which indicates the hand movement indicating the user's intention to start a gesture. Upon the detection of the intended action component, the intended action component detecting unit 105 transmits an instruction for entrance into the gesture reception state to the control signal generating unit 106. In other words, the intended action component detecting unit 105 detects the component indicating the hand movement in the display screen direction as the intended action component.

At the time of entrance into the gesture reception state, as shown in (b) of FIG. 8 for example, the display screen control unit 107 transmits, to the display screen control unit 107, the information for instructing display of the second gesture guidance image 403 having a clearer boundary than the boundary of the first gesture guide image 402.

As described above, the gesture input device 100 in this embodiment is capable of guiding the user who intends to input a hand swing gesture to make a gesture of swinging his or her hand in the intended direction toward the depth direction (that is the direction d (screen) toward the display screen 108)). Accordingly, the gesture input device 100 is capable of preventing erroneous detection of a hand swing gesture when the user moves his or her hand without any intention to make a hand swing gesture (for example, when the user moves his or her hand back to the original position after making a hand swing gesture).

[Variation]

The present invention is not limited to the above-described embodiments. The following implementations are also included in the present invention.

(1) The gesture input device according to any of the embodiments is, for example, a computer system including a microprocessor, a ROM, a RAM, a hard disk unit, a display unit, a keyboard, a mouse, and so on. The ROM or the hard disk unit stores a computer program. The gesture input device achieves its functions through the microprocessor's operation according to the computer program. Here, the computer program for achieving the predetermined functions is configured by combining plural instruction codes indicating instructions for the computer.

(2) A part or all of the structural elements of the gesture input device may be configured in the form of a single System Large-Scale Integration (System-LSI). A system-LSI is a super-multi-function LSI manufactured by integrating structural units on one chip, and is specifically a computer system configured to include a microprocessor, a ROM, a RAM, and so on. The RAM stores a computer program. The System-LSI achieves its functions through the microprocessor's operation according to the computer program.

(3) A part or all of the structural elements of the gesture input device may be configured as an IC card which can be attached to and detached from the gesture input device or as a stand-alone module. The IC card or the module is a computer system configured to include a microprocessor, a ROM, a RAM, and the so on. The IC card or the module may also be included in the aforementioned super-multi-function LSI. The IC card or the module achieves its functions through the microprocessor's operation according to the computer program. The IC card or the module may also be implemented to be tamper-resistant.

(4) The present invention may be implemented as the above-described gesture input method. Furthermore, the present invention may be implemented as a computer program for causing a computer to execute the gesture input method, and as digital signals representing the computer program.

Furthermore, the present invention may also be implemented as the computer program or the digital signals stored on a computer readable non-transitory recording media (such as flexible discs, hard disks, CD-ROMs, MOs, DVDs, DVD-ROMs, DVD-RAMS, Blu-ray Discs (BDs; registered trade mark), and semiconductor memory products). Furthermore, the present invention also includes the digital signals recorded on these recording media.

Furthermore, the present invention may also be implemented by transmitting the aforementioned computer program or digital signals via telecommunication lines, wireless or wired communication lines, networks represented by the Internet, data broadcast, and so on.

Furthermore, the present invention may also be implemented as a computer system including a microprocessor and a memory, in which the memory stores the aforementioned computer program and the microprocessor operates according to the computer program.

Furthermore, any other independent computer system according to the present invention can execute the program or the digital signals by transferring the program or the digital signals recorded on such recording media, or by transferring the program or digital signals via such networks and the like.

(5) The above described embodiments and variation may be arbitrarily combined.

INDUSTRIAL APPLICABILITY

The gesture input device according to an aspect of the present invention has a feature of allowing a user to reliably perform operations through a GUI by natural and simple hand movements, and is applicable as an input means used for a display system for presenting content and/or information on a large display screen, such as a television receiver or a digital signage. The gesture input device is also applicable for applications such as gaming machines for which hand movements for input are used.

REFERENCE SIGNS LIST

100 Gesture input device
101 User detection camera
102 Coordinate input detecting unit
103 Gesture start detecting unit
104 Guide image generating unit
105 Intended action component detecting unit
106 Control signal generating unit
107 Display screen control unit
108 Display screen
110 video display device
301, 401, 501, 602 Cursor
302, 402 First gesture guide image
303, 403 Second gesture guide image
502 Option
601 Remote controller for gesture input
6011 Motion sensor

The invention claimed is:

1. A gesture input device which generates a control signal for controlling a target device, based on a gesture of a user, the gesture input device comprising:
    a coordinate input detecting unit configured to sequentially detect sequences of sets of coordinates, the sets respectively corresponding to positions of a hand of the user;

a gesture start detecting unit configured to detect a component indicating a first hand movement predetermined as a hand movement which is made when the user intends to start a gesture, from a first coordinate sequence included in the sequences of sets of coordinates detected by the coordinate input detecting unit;

a guide image generating unit configured to generate a gesture guide image for guiding the user to make a gesture after a second hand movement, when the component indicating the first hand movement is detected by the gesture start detecting unit, the second hand movement being started at a first position included in the positions corresponding to the sets of coordinates detected by the coordinate input detecting unit, the gesture guide image being displayed at a second position, the second position being a position of a cursor after the second hand movement;

a display screen control unit configured to sequentially display the cursor at the positions on the display screen corresponding to the sets of coordinates detected by the coordinate input detecting unit, and display the gesture guide image generated by the guide image generating unit on the display screen;

an intended action component detecting unit configured to detect a component indicating the second hand movement as an intended action component of the gesture, from a second coordinate sequence which is included in the sequences of sets of coordinates detected by the coordinate input detecting unit, after the gesture guide image is displayed on the display screen by the display screen control unit; and a control signal generating unit configured to detect a component indicating a hand movement corresponding to the gesture and succeeding the intended action component from the second coordinate sequence when the intended action component is detected by the intended action component detecting unit, and generate a control signal in accordance with a result of the detection, wherein the second position is different from a position of the cursor at the time when the component indicating the first hand movement is detected, the second hand movement is a hand movement for moving the cursor from (i) the position of the cursor at the time when the component indicating the first hand movement is detected to (ii) the second position, and the second position is displayed to be apart from the position of the cursor at the time when the component indicating the first hand movement is detected in a direction different from a movement direction of the cursor at the time when the component indicating the first hand movement is detected.

2. The gesture input device according to claim 1, wherein the guide image generating unit is configured to generate the gesture guide image with a depth expression which allows the user to see the gesture guide image as if the gesture guide image were positioned behind the cursor in a depth direction on the display screen, and the gesture after the second hand movement is made toward the depth direction.

3. The gesture input device according to claim 1, wherein the coordinate input detecting unit is configured to detect one of the sets of coordinates corresponding to a current one of the positions of the hand of the user, based on a captured image in which the user is present in front of the display screen.

4. The gesture input device according to claim 1, wherein, when the user holds and moves a remote controller for gesture input having a motion sensor, the coordinate input detecting unit is configured to detect one of the sets of coordinates corresponding to one of the positions of the hand of the user, based on hand movement information obtained through the motion sensor of the remote controller for gesture input.

5. The gesture input device according to claim 1, wherein the gesture guide image is an image for guiding the user to make a plurality of gestures, and the control signal generating unit is configured to detect a component indicating a hand movement corresponding to any one of the plurality of gestures, and generate the control signal according to the gesture corresponding to the component indicating the detected hand movement.

6. The gesture input device according to claim 1, wherein the display screen control unit is configured to change a display appearance of the gesture guide image on the display screen when the intended action component is detected by the intended action component detecting unit.

7. The gesture input device according to claim 1, wherein the first hand movement includes the hand movement or a stop of a hand movement in a space having a predetermined size for a given period.

8. The gesture input device according to claim 1, wherein the gesture input device is configured as an integrated circuit.

9. A gesture input method for generating a control signal for controlling a target device, based on a gesture of a user, the gesture input method comprising:

sequentially detecting sequences of sets of coordinates, the sets respectively corresponding to positions of a hand of the user;

detecting a component indicating a first hand movement predetermined as a hand movement which is made when the user intends to start a gesture, from a first coordinate sequence included in the sequences of sets of coordinates detected in the detecting of sequences of sets of coordinates;

generating a gesture guide image for guiding the user to make a gesture after a second hand movement, when the component indicating the first hand movement is detected in the detecting of a component indicating a first hand movement predetermined as a hand movement, the second hand movement being started at a first position included in the positions corresponding to the sets of coordinates detected in the detecting of a component indicating a first hand movement predetermined as a hand movement, the gesture guide image being displayed at a second position, the second position being a position of a cursor on a display screen after the second hand movement;

sequentially displaying the cursor at the positions on the display screen corresponding to the sets of coordinates detected in the detecting of a component indicating a first hand movement predetermined as a hand movement, and displaying, on the display screen, the gesture guide image generated in the generating of a gesture guide image;

detecting a component indicating the second hand movement as an intended action component of the gesture, from a second coordinate sequence which is included in the sequences of sets of coordinates detected in the detecting of a component indicating a first hand movement predetermined as a hand movement, after the gesture guide image is displayed on the display screen in the displaying; and detecting a component indicating a hand movement corresponding to the gesture and succeeding the intended action component from the second coordinate sequence when the intended action component is detected in the detecting of a component indicating the second hand movement as an intended action component, and generating a control signal in accordance with a result of the detection, wherein the second position is different from a position of the cursor at the time when the component indicating the first hand movement is detected, the second hand movement is a hand movement for moving the cursor from (i) the position of the cursor at the time when the component indicating the first hand movement is detected to (ii) the second position, and the second position is displayed to be apart from the position of the cursor at the time when the component indicating the first hand movement is detected in a direction different from a movement direction of the cursor at the time when the component indicating the first hand movement is detected.

10. A non-transitory computer-readable recording medium having the program recorded thereon for causing the computer to execute the gesture input method according to claim 9.

11. The gesture input device according to claim 1,
the second position is displayed to be apart from the position of the cursor at the time when the component indicating the first hand movement is detected in a direction opposite to or orthogonal to a movement direction of the cursor at the time when the component indicating the first hand movement is detected.

12. A gesture input device which generates a control signal for controlling a target device, based on a gesture of a user, the gesture input device comprising:

a processor; and a non-transitory memory storing thereon executable instructions, which when executed by the processor, cause the processor to perform:

sequentially detecting sequences of sets of coordinates, the sets respectively corresponding to positions of a hand of the user;

detecting a component indicating a first hand movement predetermined as a hand movement which is made when the user intends to start a gesture, from a first coordinate sequence included in the sequences of sets of coordinates detected in the detecting of sequences of sets of coordinates;

generating a gesture guide image for guiding the user to make a gesture after a second hand movement, when the component indicating the first hand movement is detected in the detecting of a component indicating a first hand movement predetermined as a hand movement, the second hand movement being started at a first position included in the positions corresponding to the sets of coordinates detected in the detecting of a component indicating a first hand movement predetermined as a hand movement, the gesture guide image being displayed at a second position, the second position being a position of a cursor on a display screen after the second hand movement;

sequentially displaying the cursor at the positions on the display screen corresponding to the sets of coordinates detected in the detecting of a component indicating a first hand movement predetermined as a hand movement, and displaying, on the display screen, the gesture guide image generated in the generating of a gesture guide image;

detecting a component indicating the second hand movement as an intended action component of the gesture, from a second coordinate sequence which is included in the sequences of sets of coordinates detected in the detecting of a component indicating a first hand movement predetermined as a hand movement, after the gesture guide image is displayed on the display screen in the displaying; and detecting a component indicating a hand movement corresponding to the gesture and succeeding the intended action component from the second coordinate sequence when the intended action component is detected in the detecting of a component indicating the second hand movement as an intended action component, and generating a control signal in accordance with a result of the detection, wherein the second position is different from a position of the cursor at the time when the component indicating the first hand movement is detected, the second hand movement is a hand movement for moving the cursor from (i) the position of the cursor at the time when the component indicating the first hand movement is detected to (ii) the second position, and the second position is displayed to be apart from the position of the cursor at the time when the component indicating the first hand movement is detected in a direction different from a movement direction of the cursor at the time when the component indicating the first hand movement is detected.

* * * * *